United States Patent Office 3,366,608
Patented Jan. 30, 1968

3,366,608
ANIONIC POLYMERIZATION OF CAPROLACTAM
James Lincoln, Duffield, near Derby, and Kenneth Darling Grice, Chellaston, Derby, England, assignors to British Celanese Limited, London, England, a British company
No Drawing. Filed Apr. 15, 1965, Ser. No. 448,280
4 Claims. (Cl. 260—78)

ABSTRACT OF THE DISCLOSURE

A process for polymerizing caprolactam by heating in the presence of an alkaline catalyst, an N,N'-diacyl bis-caprolactam and triethylene tetramine.

---

This invention relates to the polymerisation of caprolactam and particularly to the manufacture of moulded articles by polymerising caprolactam in shaped moulds.

It is known that caprolactam may be polymerised by heating in the presence of suitable catalysts, among which are the alkali metals and alkaline earth metals and their compounds. In recent years it has been found that certain classes of compounds, notably those containing a tertiary nitrogen atom having two carbonyl groups attached thereto, when used in conjunction with the alkaline type of catalyst have the effect of reducing the temperature at which polymerisation occurs. As a result, by using a combination of an alkaline catalyst such as sodium metal and a promoter such as N-acetyl caprolactam to catalyse the polymerisation, it is possible to produce cast article of poly-caprolactam (or nylon 6 as it is also termed) by effecting the polymerisation at temperatures of the order of 140–180° C. in moulds of the required shape.

In accordance with this invention caprolactam is polymerised by heating it in the presence of:

(a) an alkaline catalyst,
(b) an N,N'-di-acyl bis-caprolactam having the general formula:

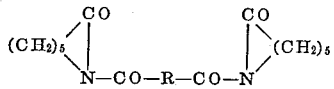

where R is the divalent radical of a dicarboxylic acid HOOC—R—COOH, in which R contains at least 6 carbon atoms,
(c) a polyamine containing two or more primary or secondary amine groups per molecule, or a polyol containing two or more hydroxyl groups per molecule, the N,N'-diacyl bis-caprolactam being used in a molar excess over the polyamine or polyol, the proportions being calculated on the basis that one primary or secondary amine group and one hydroxyl group is equivalent to one acyl imide group. The polymerisation is preferably effected in a mould so that a cast article is produced direct.

The alkaline catalyst used is preferably sodium metal but other alkaline catalysts such as sodium hydroxide, potassium or potassium hydroxide may be used. The catalyst is used in the usual catalytic amounts, for example from 0.1 to 5.0 mol percent based on the weight of the caprolactam. The N,N'-diacyl bis-caprolactam may conveniently be used in a molar quantity 1 to 2 mols per mol of alkaline catalyst.

Examples of N,N'-diacyl bis-caprolactam which may be used are N,N'-terephthaloyl-bis-caprolactam and N,N'-sebacoyl bis-caprolactam where R is p—$C_6H_4$— and —$C_8H_{16}$— respectively. The group R may be substituted with one or more groups which are inert under the polymerisation conditions.

Examples of suitable polyamines are aliphatic polyamines such as hexamethylene diamine, piperazine, diethylene triamine and triethylene tetramine, bis-(3-amino propyl)-amine, and aromatic polyamines such as the triamino-benzenes and bis-(p-aminophenyl)-amine. Polyamide-polyamines such as those derived from dimeric linoleic acid and aliphatic polyamines may also be used.

Examples of sutiable polyols are diethylene glycol, trimethylol propane and the polyglycols such as the polyethylene glycols and polypropylene glycols.

In carrying out the invention the three types of additive defined above under (a), (b) and (c) may be added as such to the caprolactam. One or other of the additives may be added as a solution in caprolactam. In another procedure, the compounds (b) and (c) may be heated together and the catalyst (a) and molten caprolactam added to the resultant product.

In carrying out the present invention it is essential that the molar proportion of the diacyl bis-caprolactam should exceed that of the polyamine or polyol. When the number of amine or hydroxyl groups is equal to or greater than the number of imide groups, the rate of polymerisation is extremely slow.

The present invention permits the production of cast articles from caprolactam having improved impact strengths compared with those obtainable with other catalysts such as N-acetyl caprolactam.

The invention is illustrated by the following examples, parts of percentages are by weight:

Example 1

0.92 part (0.04 mol) of sodium was dissolved in 465 parts of caprolactam at 100° C. The temperature of the melt was raised to 160° C. and 2.92 parts (0.02 mol) of triethylene tetramine was added, followed by a solution of 31.4 parts (0.08 mol) of N-N'-sebacoyl bis-caprolactam in 100 parts of molten caprolactam, thus bringing the total caprolactam to 565 parts (0.5 mol).

The melt was rapidly stirred to form a homogeneous solution and poured into a mould heated to 160° C. The melt began to gel 2 to 3 minutes after the addition of the sebacoyl bis-caprolactam and polymerisation was substantially complete after 30 to 35 minutes as was shown by shrinkage of the solid polymer from the walls of the mould.

The moulded article (monomer content 15.5 percent) was insoluble in concentrated (96 percent) sulphuric acid. Its impact strength as determined by the Izod method was greater than 6 ft. lb. per inch notch.

Example 2

The procedure described in Example 1 was repeated except that 28.5 parts (0.08 mol) of terephthaloyl-bis-caprolactam were used instead of the sebacoyl bis-caprolactam.

The monomer content of the product was 12.8 percent; the polymer was insoluble in concentrated sulphuric acid and had an impact strength of 5.7 ft. lb. per inch notch.

When using the procedure described in Example 1 with N-acetyl-caprolactam (24.8 parts, 0.16 mol) instead of sebacoyl-bis-caprolactam, the resultant polymer (monomer content 15.5 percent) was soluble in 96 percent sulphuric acid, the relative viscosity of a 1 percent w./v. solution being 1.60. The impact strength of the polymer was only 0.2 ft. lb. per inch notch.

Example 3

The procedure described in Example 1 was repeated except that the amount of triethylene tetramine was increased to 4.39 parts (0.03 mol).

The resultant insoluble polymer had a monomer content of 8.9 percent and an impact strength of 1.4 ft. lb. per inch notch.

Example 4

The procedure described in Example 2 was repeated except that the triethylene tetramine was replaced by 2.76 parts (0.027 mol) of diethylene triamine.

The resultant insoluble polymer had a monomer content of 9.9 percent and an impact strength of 1.8 ft. lb. per inch notch.

Example 5

The procedure described in Example 1 was repeated except that the triethylene tetramine was replaced by 4.65 parts (0.04 mol) hexamethylene diamine.

The resultant polymer had a monomer content of 13.2 percent and an impact strength of 1.5 ft. lb. per inch notch.

Example 6

The procedure described in Example 1 was repeated except that the triethylene tetramine was replaced by 3.45 parts (0.04 mol) of piperazine.

The resultant polymer had a monomer content of 19.1 percent and was soluble in 96 percent sulphuric acid (relative viscosity of 1 percent w./v. solution 4.65). The impact strength of the polymer was 4.2 ft. lb. per inch notch.

Example 7

The procedure described in Example 1 was repeated except that the triethylene tetramine was replaced by 4.24 parts (0.04 mol) of diethylene glycol.

Shrinkage of the polymer from the mould walls began 27 minutes after the addition of the sebacoyl-bis-caprolactam and was complete after 45 minutes. The polymer was removed from the mould after 60 minutes. It was soluble in 96 percent sulphuric acid, the 1 percent w./v. solution having a relative viscosity of 2.00. The monomer content of the polymer was 15.0 percent; the impact strength was 5.4 ft. lb. per inch notch.

Example 8

The procedure described in Example 1 was repeated except that the triethylene tetramine was replaced by 3.6 parts (0.027 mol) of 1,1,1-trimethylol propane. The melt gelled 2 minutes after the addition of the sebacoyl-bis-caprolactam, but shrinkage of the polymer from the mould walls did not begin till after 55 minutes. Some of the polymer surface was still adhering to the mould walls after 80 minutes when heating was stopped.

The polymer was soluble in 96 percent sulphuric acid (relative viscosity of 1 percent w./v. solution, 2.13) and it had a monomer content of 9.8 percent and an impact strength of 1.3 ft. lb. per inch notch

Example 9

To dry caprolactam (46.5 parts) was added 8.0 parts (0.002 mol) of a polyethylene glycol having a mean molecular weight of about 4000. The mixture was melted at 100° C. and 0.092 part (0.004 mol) of sodium dissolved in the melt. The temperature was then raised to 160° C. and a solution of N,N'-sebacoyl-bis-caprolactam (1.57 parts, 0.004 mol) in hot caprolactam (10 parts) added.

The mixture was thoroughly stirred and poured into a mould heated to 160° C. The melt became very viscous after 4 to 5 minutes, and after 14 minutes the solid polymer began to shrink from the mould walls. Shrinkage from the walls was complete after 24 minutes, and the cast polymer was removed from the mould after 30 minutes.

The polymer contained 11.7 percent of material extractable with methanol, a 1 percent w./v. solution of the extracted polymer in 96 percent sulphuric acid had a relative viscosity of 5.11. The impact strength of the unextracted polymer was 2.2 ft. lb. per inch notch.

Example 10

The procedure used in Example 9 was repeated except that the polyethylene glycol was replaced by 4.0 parts (0.002 mol) of a polypropylene glycol having an average molecular weight of about 2000. The polymerisation proceeded at a similar rate.

The cast polymer had an impact strength of 2.3 ft. lb. per inch notch and contained 9.1 percent of material extractable with methanol. The extracted polymer had a relative viscosity of 3.76.

Example 11

In this example the polyamide-polyamine sold under the trade name Versamid 115 was used to provide 0.08 amine equivalent in the melt. The procedure was as described in Example 1 except that the polymerisation heating time was 60 minutes. The product in this example was also insoluble in concentrated sulphuric acid.

What we claim is:

1. A process for the polymerisation of caprolactam wherein the caprolactam is heated in the presence of:
   (a) an alkaline catalyst,
   (b) an N,N'-diacyl bis-caprolactam having the general formula:

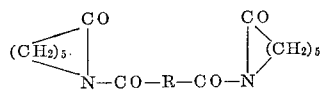

where R is the divalent radical of a dicarboxylic acid HOOC—R—COOH in which R is a hydrocation group containing at least 6 carbon atoms, and triethylene tetramine, the N,N'-diacyl bis-caprolactam being used in a molar excess over the said triethylene tetramine.

2. A process as claimed in claim 1 wherein the alkaline catalyst used is sodium metal.

3. A process as claimed in claim 1 wherein the N,N'-diacyl bis-caprolactam used is N,N'-sebacoyl bis-caprolactam.

4. A process as claimed in claim 1 wherein the N,N'-diacyl bis-caprolactam used is N,N'-terephthaloyl bis-caprolactam.

References Cited

UNITED STATES PATENTS

| | | | |
|---|---|---|---|
| 3,086,962 | 4/1963 | Motters et al. | 260—78 |
| 3,138,574 | 6/1964 | Kohan | 260—78 |
| 3,206,418 | 9/1965 | Giberson | 260—78 |
| 3,234,152 | 2/1966 | Fuller | 260—78 |
| 3,239,490 | 3/1966 | Gee et al. | 260—78 |
| 3,304,291 | 2/1967 | Dachs et al. | 260—78 |
| 3,308,099 | 3/1967 | Mermoud et al. | 260—78 |

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,366,608　　　　　　　　　　　　　January 30, 1968

James Lincoln et al.

It is certified that error appears in the above identified patent and that said Letters Patent are hereby corrected as shown below:

Column 3, line 45, "5.4" should read -- 4.5 --. Column 4, line 43, "hydrocation" should read -- hydrocarbon --.

Signed and sealed this 16th day of September 1969.

(SEAL)
Attest:

Edward M. Fletcher, Jr.
Attesting Officer

WILLIAM E. SCHUYLER, JR.
Commissioner of Patents